Sept. 27, 1966 J. H. SASSEEN 3,275,757

CARRIER-ERASE MAGNETIC TAPE RECORDING

Filed March 27, 1963

INVENTOR.
JOHN H. SASSEEN,

BY John B. Davidson
ATTORNEY.

3,275,757
Patented Sept. 27, 1966

3,275,757

CARRIER-ERASE MAGNETIC TAPE RECORDING

John H. Sasseen, Houston, Tex., assignor, by mesne assignments, to Esso Production Research Company, Houston, Tex., a corporation of Delaware Filed Mar. 27, 1963, Ser. No. 268,369
4 Claims. (Cl. 179—100.2)

This invention relates generally to magnetic tape recording, and more particularly to the magnetic recording of D.C. or low frequency A.C. electrical signals in accordance with the carrier-erase recording technique.

The recordation of data signals on magnetic tape has become increasingly popular because of the accuracy of such recordation in view of the wide dynamic range possible therewith, and because of the ease of reproducing data signals when they are recorded on magnetic tape. However, direct recordation of D.C. or low frequency A.C. signals on magnetic tape has not been practiced because the signals are difficult to record and reproduce inasmuch as the magnitude of signals recorded and reproduced using the magnetic recording technique is a function of the rate of change through the windings in the recording head and the pickup head. Various techniques have been developed to permit recordation of such signals. A very successful technique is the so-called carrier-erase magnetic recording technique wherein a prerecorded, constant amplitude signal is erased in accordance with the amplitude of the D.C. or low frequency A.C. signal to be recorded. This technique has required the use of a special recording head having two separate windings, one winding to adjust the level of demagnetization of the magnetic tape (called the bias winding), and the other winding to receive the signal to be recorded so as to vary the amount of erasure of the pre-recorded signal.

Inasmuch as the carrier-erase technique as heretofore practiced has required a special recording head, it has not achieved widespread acceptance, particularly in connection with recordation of well logging signals. The reason for this lack of acceptance is that recording equipment is normally supplied with a single center tapped winding, and it is difficult to replace such heads with the special heads required when the carrier-erase technique is used.

In accordance with the present invention, a magnetic medium whereon has been pre-recorded a constant amplitude electrical signal is utilized in the usual manner. The pre-recorded signal is erased by means of an erase head having a center tapped winding. The output of an erase oscillator is coupled to the erase head winding and the amplitude of the oscillator is varied in accordance with a data signal to be recorded. A constant amplitude direct current is passed through one-half of the erase head winding and an adjustable direct current is passed through the other half of the winding. The adjustable direct current is set at an amplitude necessary to achieve a linear, residual flux erase current characteristic of the tape. As the amplitude of the oscillator is varied in accordance with the signal to be recorded, the pre-recorded signal is erased in accordance with the variations in amplitude of the erase signal. At a later time the signal remaining on the tape can be reproduced and the data signal can be detected and reproduced or visually recorded in the usual manner.

Objects and features of the invention not apparent from the above discussion will become evident upon consideration of the following detailed description of the invention taken in connection with the accompanying drawings, wherein.

Figures 1, 2, 3:
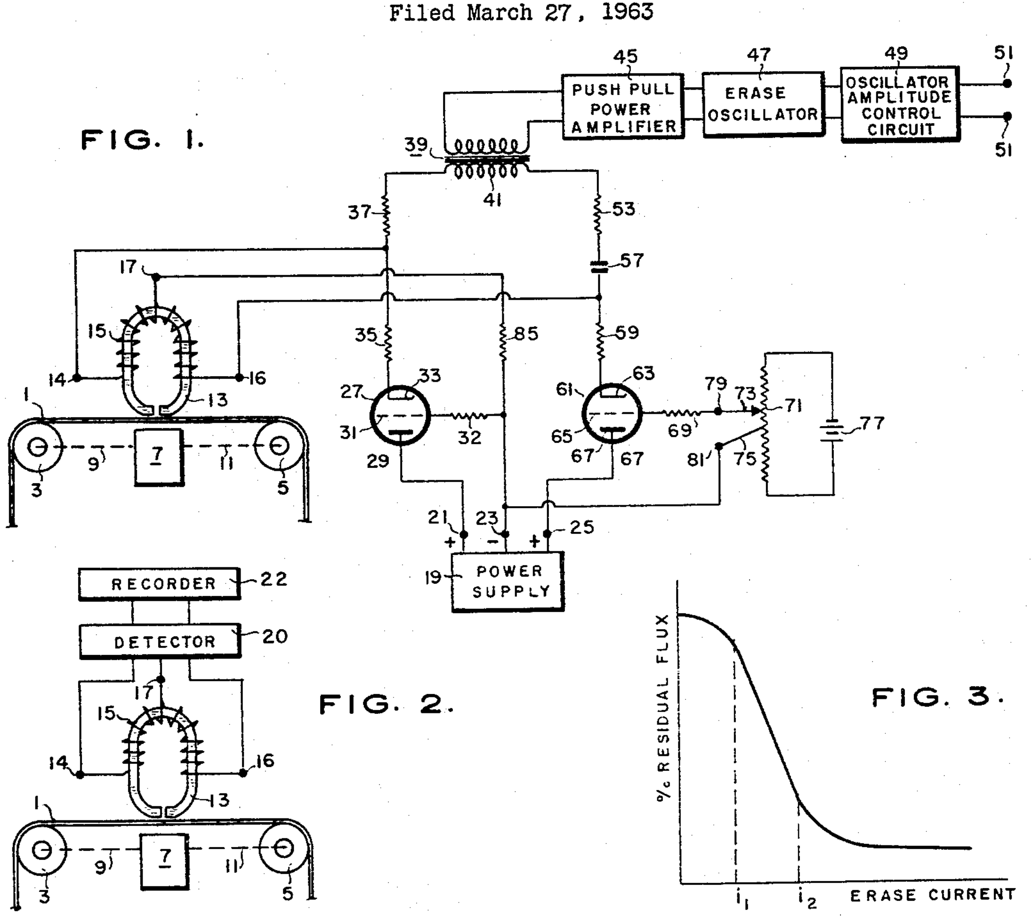
FIG. 1 is a schematic diagram of magnetic recording apparatus in accordance with the invention.
FIG. 2 is schematic diagram of apparatus for reproducing data signals previously recorded in accordance with the invention.
FIG. 3 is a coordinate representation of percent residual flux in a magnetic tape as a function of erase current amplitude.

With reference now to FIG. 1, there is shown in elemental form a magnetic tape transport means including suitable guide rollers 3 and 5 driven by a motor 7 through a mechanical transmission designated by lines 9 and 11. Conventional auxiliary apparatus may be used such as idler rollers and speed control apparatus. The tape transport means is adapted to move the magnetic tape 1 in magnetic recording relationship past a recording head 13 having a center tapped winding thereon. The winding 15 is provided with end connectors 14 and 16 and a center tap connector 17.

An erase oscillator 47 is controlled by means of an oscillator amplitude control circuit 49. The amplitude control circuit 49 may be a reactance tube circuit or other circuit adapted to control the amplitude of the output signal of an oscillator in accordance with variations in the amplitude of a control signal coupled thereto. A suitable combination of an amplitude modulator or oscillator amplitude control circuit and an oscillator controlled thereby is illustrated and described at pp. 294–299 of the text, "Active Networks," by V. G. Rideout (Prentice Hall, 1954), and in "Radiotron Designers Handbook, fourth ed., Radio Corp. of America (1952). The oscillator amplitude control circuit 49 is provided with input terminals 51 to which is coupled the data signal to be recorded.

The output of the oscillator 47 is coupled to the primary winding of an oscillating transformer 39 through a push-pull power amplifier 45. The secondary winding 41 of transformer 39 is connected to end connectors 14 and 16 through resistors 37 and 53 and capacitor 57. The function of capacitor 57 is to prevent direct current from the circuit to be described from flowing through the winding 41.

Manifestly, the circuit described above is capable of energizing the head 13 to record electrical signals on tape 1. However, in accordance with the invention, it is necessary to provide means for adjusting the ambient magnetization of the tape at a suitable level. For this purpose there is provided circuit means connected between end connector 16 and center tap connector 17 for passing a constant amplitude direct current through one-half of the recording head winding, and circuit means connected between end connector 14 and center tap connector 17 for passing an adjustable direct current through the other half of the recording head winding 15. The first circuit means referred to above includes an electrical valve, here shown as vacuum tube 27 having a cathode 33, a control electrode 31, and a plate electrode 29. The cathode is connected to end connector 14 through resistor 35. The plate electrode is connected to a positive terminal 21 of power supply 19, and the control electrode 31 is connected through resistor 32 to the negative terminal 23 of power supply 19. The center tap connector 17 also is connected through resistor 85 to the negative terminal 23. Resistor 85 functions to set up an interaction which exerts a degree of automatic balance between tubes 27 and 61, giving a push-pull characteristic to the two-tube combination. The second circuit means referred to above includes an electric valve, here shown as vacuum tube 61, which includes cathode 63, control electrode 65, and plate electrode 67. The cathode is connected to end connector 16 through resistor 59 and the plate electrode is connected to positive terminal 25 of power supply 19. The bias on the control electrode is varied by a circuit including battery 77 having connected thereacross a center tapped potentiometer 71. The center tap 75 of the potentiometer is connected to a terminal 81, which in turn is connected to the negative terminal 23 of power supply 19. The variable tap 73 is connected to a connector 79, and the control electrode 65 is connected to connector 79 through resistor 69. Thus, the current flowing through the half of winding 15 between connectors 16 and 17 can be varied by adjusting the adjustable tap 73 on potentiometer 71.

The frequency of erase oscillator 47 should be at least 10 times the frequency of the signal pre-recorded on tape 1. Furthermore, the period of the data signal connected to terminal 51 should be no greater than one quarter the period of the pre-recorded signal on tape 1. In a typical embodiment of the invention, it was found advantageous to adjust the erase oscillator 47 to a frequency of 15 to 20 kilocycles and to pre-record on tape 1 an 800-cycle signal.

The operation of the circuit of FIG. 1 will be described with reference to FIGS. 3 through 7. In FIG. 3 there is shown a curve of percent residual flux in a magnetic tape as a function of erase current amplitude in winding 15. It will be noted that a portion of the curve between $i_1$ and $i_2$ is substantially linear. Let it be assumed that a sinusoidal signal has been pre-recorded on tape 1 having a constant amplitude such that the magnetization of the tape is varied between levels requiring currents of magnitude between $i_1$ and $i_2$ for erasure thereof. In other words, the signal amplitude is such that the magnetic tape is varied over the linear portion of its hysteresis loop. The current flowing through vacuum tube 61 is varied by adjusting the tap 73 on potentiometer 71 until the magnetization of the core of recording head 13 is of such magnitude as to place the magnetic tape at the upper knee of the curve of FIG. 3 corresponding to erase current $i_1$. Thus, the difference between the currents flowing between connectors 14 and 17 and the current flowing between connectors 17 and 16 will be equal to $i_1$.

Figure 4:
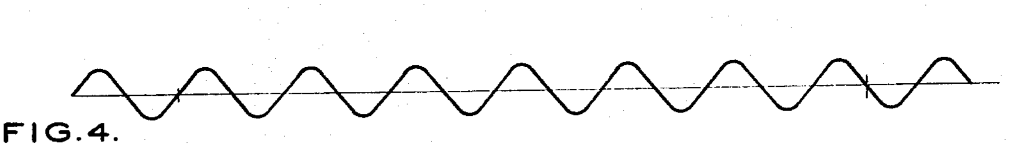
FIGS. 4, 5, 6, and 7 are waveform representations of electrical currents at various points in the circuit of FIG. 1, useful in understanding the operation of the circuit of FIG. 1.
Figure 5:
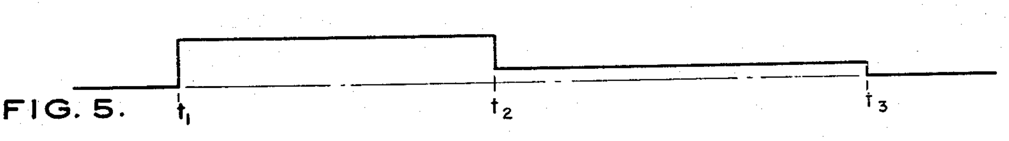
Figure 6:
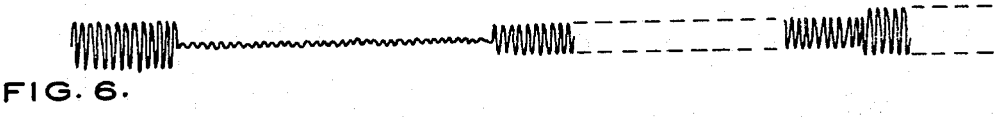
Figure 7:
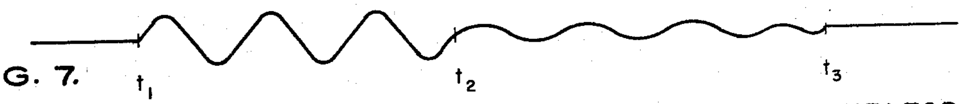

FIG. 4 is a waveform representation of a constant amplitude signal that has been pre-recorded on tape 1. FIG. 5 represents a data signal applied to terminals 51. FIG. 6 is a waveform representation of the output signal of erase oscillator 47 responsive to the signal shown in FIG. 5. The erase signal of FIG. 6, when applied to the winding 15 of erase recording head 13, functions to erase the signal as shown in FIG. 4 from the tape. The signal remaining on the tape will be substantially as shown in FIG. 7. The erase signal will remove substantially all of the pre-recorded signal until time $t_1$. During the interval from $t_1$ to $t_2$, the erase signal will be of extremely small or zero amplitude so that the pre-recorded signal will remain substantially unaltered until time $t_2$. During the interval betwen time $t_2$ and $t_3$ the signal applied to terminals 51 is of intermediate amplitude; likewise, the output signal from the erase oscillator is of intermediate amplitude so that the pre-recorded signal is only partially erased from the magnetic tape. After time $t_3$ the data signal shown in FIG. 5 will be of zero amplitude so that substantially all of the pre-recorded signal is erased.

Manifestly, the data signal may be of a continuously varying nature rather than of rectangular waveform as shown in FIG. 5. It is important that the period of the data signal be no greater than one-quarter the period of the pre-recorded signal.

At a time subsequent to the time at which the signal is recorded, a detector 20 and recorder 22 may be coupled to the winding 15 as shown in FIG. 2. The partially erased signal remaining on the tape will be reproduced by head 13 and detected by detector 20 to remove components thereof having the frequency of the pre-recorded signal. The signal applied to recorder 22 will be substantially as shown in FIG. 5.

The apparatus of FIG. 1 may be used for recording the constant amplitude pre-recorded signal by applying the signal between terminals 79 and 81 and by using the erase oscillator as an alternating current bias for this signal.

The invention is not to be restricted to the specific structural details, circuit connections, or arrangement of parts herein set forth, as various modifications thereof may be effected without departing from the spirit and scope of the invention.

The objects and features of the invention having been completely described, what I wish to claim is:

1. Apparatus for providing an electromagnetically reproducible recording of an electrical control signal on a magnetic tape on which is previously recorded a constant amplitude, sinusoidal signal having a period at least four times the period of said control signal, said apparatus comprising:

an electromagnetic recording head including a winding having a center tap and first and second end connections;

magnetic tape transport means for moving said magnetic tape in magnetic recording relationship past said recording head;

an insolating transformer having a primary winding and a secondary winding;

first circuit means for coupling said secondary winding across said first and second end connections;

resistor means connected to said center tap;

second circuit means connected between said first end connection and said center tap through said resistor means for passing a constant amplitude direct current through one-half of said recording head winding;

third circuit means connected between said second end connection and said center tap through said resistor means for passing a direct current through the other half of said recording head winding;

means coupled to said third circuit means for adjusting the amplitude of the direct current through the other half of said recording head winding whereby the flux level produced by current flow through said first and second circuit means and said winding is of a predetermined value;

fourth circuit means coupled to said primary winding for supplying to said primary winding a signal having a frequency not less than ten times the frequency of the pre-recorded signal on the tape carried past said recording head; and fifth circuit means connected to said fourth circuit means and having input terminal means for varying the amplitude of the output signal of said fourth circuit means in accordance with variations in amplitude of an electrical control signal applied to said input terminal means.

2. Apparatus for providing an electromagnetically reproducible recording of an electrical control signal on a magnetic tape on which is previously recorded a constant amplitude, sinusoidal signal having a period at least four times the period of said control signal, said apparatus comprising:

an electromagnetic recording head including a winding having a center tap and first and second end connections;

magnetic tape transport means for moving said magnetic tape in magnetic recording relationship past said recording head;

an isolating transformer having a primary winding and a secondary winding;

first circuit means for coupling said secondary winding across said first and second end connections;

resistor means connected to said center tap;

second circuit means connected between said first end connection and said center tap through said resistor means for passing a constant amplitude direct current through one-half of said recording head winding;

third circuit means connected between said second end connection and said center tap through said resistor means for passing a direct current through the other half of said recording head winding;

means coupled to said second circuit means for adjusting the amplitude of the direct current through the other half of said recording head winding whereby the flux level produced by current flow through said first and second circuit means and said winding is of a predetermined value; and fourth circuit means including input terminal means, coupled to said primary winding for supplying to said primary winding an electrical signal having no frequency component less than ten times the frequency of the pre-recorded signal on the tape carried past said recording head and variable in amplitude in accordance with variations in amplitude of an electrical control signal applied to said input terminal means.

3. Apparatus for providing an electromagnetically reproducible recording of an electrical control signal on a magnetic tape on which is previously recorded a constant amplitude, sinusoidal signal having a period at least four times the period of said control signal, said apparatus comprising:

an electromagnetic recording head including a winding having a center tap and first and second end connections;

magnetic tape transport means for moving said magnetic tape in magnetic recording relationship past said recording head;

resistor means connected to said center tap;

first circuit means connected between said first end connection and said center tap through said resistor means for passing a constant amplitude direct current through one-half of said recording head winding;

second circuit means connected between said second end connection and said center tap through said resistor means for passing a direct current through the other half of said recording head winding;

means coupled to said second circuit means for adjusting the amplitude of the direct current through the other half of said recording head winding whereby the flux level produced by current flow through said first and second circuit means and said winding is of a predetermined value;

third circuit means including input terminal means, coupled to said primary winding for supplying to said primary winding an alternating current electrical signal having no frequency component less than ten times the frequency of the pre-recorded signal on the tape carried past said recording head, and variable in amplitude in accordance with variations in amplitude of an electrical control signal applied to said input terminal means; and circuit means coupled between said third circuit means and said first and second end connections for applying the alternating current output signal of said third circuit means across the entirety of said recording head winding.

4. Apparatus for providing an electromagnetically reproducible recording of an electrical control signal on a magnetic tape on which is previously recorded a constant amplitude, sinusoidal signal having a period at least four times the period of said control signal, said apparatus comprising:

an electromagnetic recording head including a winding having a center tap and first and second end connections;

magnetic tape transport means for moving said magnetic tape in magnetic recording relationship past said recording head;

resistor means connected to said center tap;

first and second electrical valve means each including a control electrode for varying current flow therethrough;

first circuit means coupling said first electrical valve means between said first end connection and said center tap through said resistor means for passing direct current through one-half of said recording head winding;

second circuit means coupling said second electrical valve means between said second end connection and said center tap through said resistor means for passing direct current through the other half of said recording head winding;

means connected to the control electrode of said first electrical valve means for maintaining at a constant amplitude the direct current through said one-half of said recording head winding;

adjustable means connected to the control electrode of said second electrical valve means for adjusting the direct current through said other half of said recording head winding to an amplitude such that the net flux produced by current flow through said first and second electrical means and said winding is of predetermined value;

third circuit means including input terminal means coupled to said primary winding for supplying to said primary winding an alternating current electrical signal having no frequency component less than ten times the frequency of the pre-recorded signal on the tape carried past said recording head, and variable in amplitude in accordance with variations in amplitude of an electrical control signal applied to said input terminal means; and circuit means coupled between said third circuit means and said first and second end connections for applying the alternating current output signal of said third circuit means across the entirety of said recording head winding.

No references cited.

BERNARD KONICK, *Primary Examiner.*

AL BERNARD, *Assistant Examiner.*